United States Patent
Wang et al.

(10) Patent No.: US 12,219,046 B2
(45) Date of Patent: Feb. 4, 2025

(54) METHOD FOR PUSHING KEY, METHOD FOR OPERATING FILE, STORAGE MEDIUM, AND COMPUTER DEVICE

(71) Applicant: CHANGXIN MEMORY TECHNOLOGIES, INC., Hefei (CN)

(72) Inventors: Zhen Wang, Hefei (CN); Yue Shen, Hefei (CN); Zhongwen Fan, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 302 days.

(21) Appl. No.: 17/807,123

(22) Filed: Jun. 15, 2022

(65) Prior Publication Data

US 2022/0311601 A1    Sep. 29, 2022

Related U.S. Application Data

(63) Continuation of application No. PCT/CN2021/114114, filed on Aug. 23, 2021.

(30) Foreign Application Priority Data

Mar. 18, 2021 (CN) .......................... 202110291158.9

(51) Int. Cl.
- *H04L 29/06* (2006.01)
- *H04L 9/06* (2006.01)
- *H04L 9/08* (2006.01)
- *H04L 9/14* (2006.01)

(52) U.S. Cl.
CPC .......... *H04L 9/0819* (2013.01); *H04L 9/0637* (2013.01); *H04L 9/14* (2013.01)

(58) Field of Classification Search
CPC ....... H04L 9/0819; H04L 9/0637; H04L 9/14; H04L 9/088; H04L 63/105
See application file for complete search history.

(56) References Cited

U.S. PATENT DOCUMENTS

| 10,956,584 | B1* | 3/2021 | Heaton ................. G06F 9/3802 |
| 11,720,689 | B2* | 8/2023 | Watanabe ............ H04L 9/0825 |
| 2002/0159596 | A1* | 10/2002 | Durand ................... H04L 63/10 380/255 |
| 2008/0192937 | A1 | 8/2008 | Challener | |
| 2010/0158253 | A1 | 6/2010 | Challener | |

(Continued)

FOREIGN PATENT DOCUMENTS

| CN | 101241527 A | 8/2008 |
| CN | 104331661 A | 2/2015 |

(Continued)

OTHER PUBLICATIONS

First Office Action of the Chinese application No. 202110291158.9, issued on Mar. 10, 2022.

*Primary Examiner* — Mahfuzur Rahman
(74) *Attorney, Agent, or Firm* — Syncoda LLC; Feng Ma (57) ABSTRACT

A method for pushing a key includes the following steps: setting a plurality of keys, each of which corresponds to a different encrypted environment; configuring a user terminal with an environment switching interface for selection of an encrypted environment; and pushing a corresponding key to the user terminal according to a received key acquisition request.

10 Claims, 7 Drawing Sheets

- S10: Setting a plurality of keys, each of which corresponds to a different encrypted environment
- S11: Configuring a user terminal with an environment switching interface for selection of an encrypted environment
- S12: Pushing a corresponding key to the user terminal according to a received key acquisition request (56) References Cited

U.S. PATENT DOCUMENTS

| | | | |
|---|---|---|---|
| 2012/0109830 A1* | 5/2012 | Vogel | G06Q 30/06 |
| | | | 705/64 |
| 2013/0110828 A1 | 5/2013 | Meyerzon | |
| 2014/0074881 A1 | 3/2014 | Meyerzon et al. | |
| 2017/0177733 A1 | 6/2017 | Meyerzon et al. | |
| 2019/0149365 A1* | 5/2019 | Chatterjee | H04L 25/0226 |
| | | | 370/329 |
| 2022/0382885 A1* | 12/2022 | Durham | G06F 12/0646 |

FOREIGN PATENT DOCUMENTS

| | | |
|---|---|---|
| CN | 105912895 A | 8/2016 |
| CN | 106650482 A | 5/2017 |
| CN | 106936787 A | 7/2017 |
| CN | 107104797 A | 8/2017 |
| CN | 107211019 A | 9/2017 |
| CN | 108563959 A | 9/2018 |
| CN | 109740363 A | 5/2019 |
| CN | 109784007 A | 5/2019 |
| CN | 110460563 A | 11/2019 |
| CN | 110502918 A | 11/2019 |
| CN | 113079011 A | 7/2021 |
| WO | 2017114601 A1 | 7/2017 |

\* cited by examiner

METHOD FOR PUSHING KEY, METHOD FOR OPERATING FILE, STORAGE MEDIUM, AND COMPUTER DEVICE

CROSS-REFERENCE TO RELATED APPLICATIONS

This application is a continuation of International Application No. PCT/CN2021/114114 filed on Aug. 23, 2021, which claims priority to Chinese Patent Application No. 202110291158.9 filed on Mar. 18, 2021. The disclosures of these applications are hereby incorporated by reference in their entirety.

TECHNICAL FIELD

The disclosure relates to, but is not limited to, a method for pushing a key, a method for operating a file, a computer-readable storage medium, and a computer device.

BACKGROUND

The encryption software in some implementations uses a key to perform single-machine encryption on the data on a computer terminal. In the case of high secret protection requirements, it is easy to accidentally open a low-level key encrypted file when using a high-level key to operate the file, thereby accidentally encrypting the low-level key encrypted file into a high-level key encrypted file. This will cause a large number of users to passively install high-level keys for reading, which will slowly transform the multi-key environment in the network into a single-key environment. Therefore, how to distinguish the confidentiality level from the source of the data and to determine which key should be used for encryption are problems that need to be solved in some implementations, so as to prevent the generation of low-secret level encrypted files from being erroneously encrypted to high-secret level due to the operation performed using the high-level key.

SUMMARY

The embodiments in the disclosure provide a method for pushing a key, which includes the following steps: setting a plurality of keys, each of which corresponds to a different encrypted environment; configuring a user terminal with an environment switching interface for selection of an encrypted environment; and pushing a corresponding key to the user terminal according to a received key acquisition request.

The embodiments in the disclosure further provide a method for operating a file, which includes the following steps: acquiring a file operation instruction and a file to be operated; detecting a current encrypted environment according to the file operation instruction; acquiring a key matching the current encrypted environment; and operating the file to be operated by using the key.

The embodiments in the disclosure further provide a computer device including a memory storing processor-executable instructions, and a processor. The processor is configured to execute the stored processor-executable instructions to perform operations of: setting a plurality of keys, each of which corresponds to a different encrypted environment; configuring a user terminal with an environment switching interface for selection of an encrypted environment; and pushing a corresponding key to the user terminal according to a received key acquisition request.

BRIEF DESCRIPTION OF THE DRAWINGS

In order to explain the technical solutions of the embodiments in the disclosure more clearly, the following will briefly introduce the drawings that need to be used in the embodiments of the disclosure. Obviously, the drawings in the following description are only some embodiments of the present application. For those of ordinary skill in the art, other drawings can be obtained from these drawings without any creative effort.

DETAILED DESCRIPTION

In order to make the objective, technical means and effects of the disclosure clearer and clearer, the disclosure will be further elaborated below in combination with the accompanying drawings. It should be understood that the embodiments described here are only a part of the embodiments of the disclosure, rather than all of the embodiments, and are not intended to limit the disclosure. Based on the embodiments in the disclosure, all other embodiments obtained by those skilled in the art without any creative effort shall fall within the protection scope of the disclosure.

Figure 1:
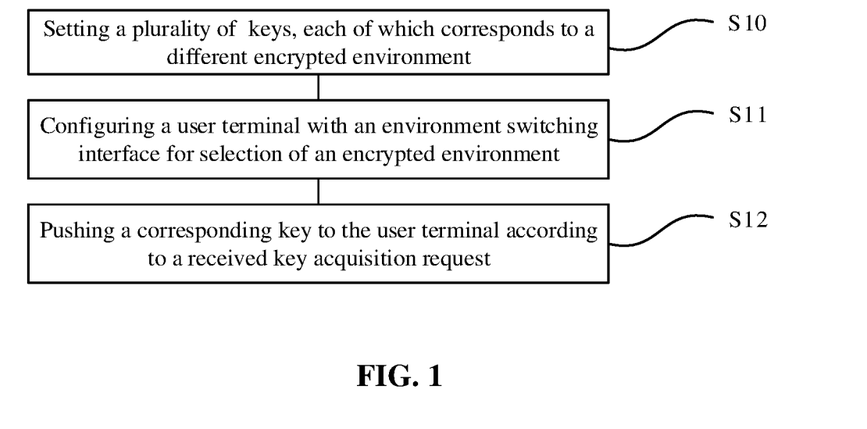
FIG. 1 illustrates a schematic diagram of the implementation steps of the method described in an embodiment of the disclosure.

Firstly, an embodiment of the method for encrypting a file described in the disclosure is given in combination with the accompanying drawings. FIG. 1 illustrates a schematic diagram of the implementation steps of the method described in the above embodiment, which includes: in Step S10, a plurality of keys are set, each of which corresponds to a different encrypted environment; in Step S11, a user terminal is configured with an environment switching interface for selection of an encrypted environment; and in Step S12, a corresponding key is pushed to the user terminal according to a received key acquisition request.

Figure 2A:
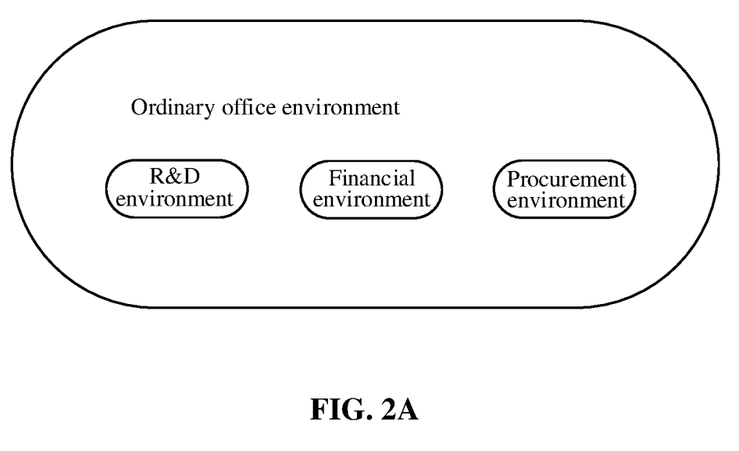
FIG. 2A illustrates a schematic diagram of a secret level configuration method for an encrypted environment in an embodiment of the disclosure.

The above method includes steps to be implemented on the server terminal during the encryption operation. Specifically, referring to Step S10, a plurality of keys are set, each of which corresponds to a different encrypted environment. A plurality of encrypted environments and corresponding keys are set up on the server. The encrypted environment can have different confidentiality levels. The plurality of encrypted environments may include, for example, a plurality of encrypted environments such as an ordinary office environment, a research and development (R&D for short)

environment, a financial environment, and a procurement environment, and there may also be a hierarchical relationship between different environments. FIG. 2A illustrates a secret level configuration method for an encrypted environment in an embodiment of the disclosure. The secret level of an ordinary office environment is the lowest, and the R&D environment, financial environment, procurement environment, etc. have higher secret levels and are independent of each other. Keys are configured for each encrypted environment according to the above configuration method, including general office keys, R&D keys, financial keys, and procurement keys. Wherein the department that uses the general office key is all employees, and all employees can have this office key and use this key to encrypt all ordinary office files. The employees in the R&D and production department use the R&D key to encrypt R&D files, and the office key to encrypt ordinary office files. The files encrypted by the office key can be circulated in all departments (without decryption), and the files encrypted by the R&D key can only be circulated in the R&D and production departments, for the reason that only these departments have the key. The configuration of other departments is similar.

Figure 2B:
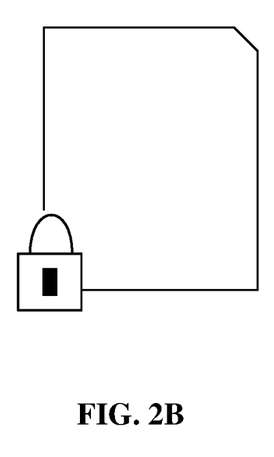
FIG. 2B illustrates a schematic diagram of an encrypted file icon in an embodiment of the disclosure.

Referring to Step S11, a user terminal is configured with an environment switching interface for selection of an encrypted environment. The encrypted environment is the encrypted environment specified in the previous step, and an encryption status of the file to be operated is represented by an encrypted file icon and an identifier. The identifier may be, as shown in FIG. 2B, a lock icon is attached to an icon of the file to be operated to distinguish whether the file to be operated is an encrypted file by whether it has the lock icon, and the lock icon has different colors to distinguish between different encryption modes. The key used for encryption is one of the keys defined in Step S10. The type of the key uniquely corresponds to the encrypted environment.

Figure 2C:
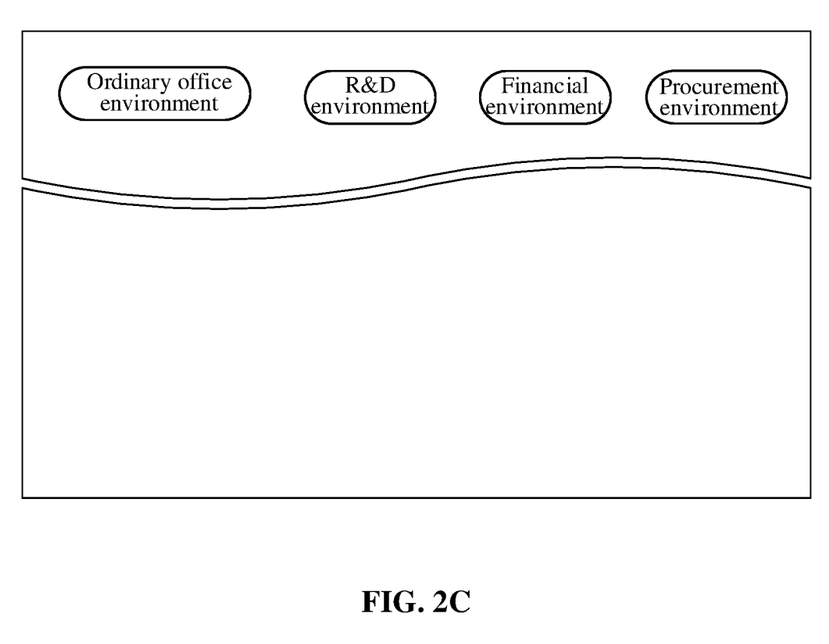
FIG. 2C illustrates a schematic diagram of the selection interface of the user terminal in an embodiment of the disclosure.

The encrypted environment may include, for example, a plurality of encrypted environments such as an ordinary office environment, an R&D environment, a financial environment, and a procurement environment. In an embodiment of the disclosure, as shown in FIG. 2C, buttons of different colors and/or texts may be provided on the selection interface of the user terminal to distinguish different encrypted environments and perform environment switching. The color of the button is the same as that of the lock icon to avoid misoperation. For example, as shown in FIG. 2C, buttons of different colors are set on the top of the computer screen, corresponding to four encrypted environments respectively. In other embodiments, it may also be a mobile phone screen or other terminal display apparatus used to read encrypted files; the buttons of different colors shown can also be replaced with buttons of different shapes, or replaced by a sliding switch or scroll wheel to switch between different encrypted environments. In this step, the encrypted environment within the permission scope can be configured for different user terminals. For example, for the computer of the R&D personnel, only two selection buttons of the ordinary office environment and the R&D environment are configured, and the selection buttons of other encrypted environments, such as the financial environment, are not configured, which can ensure that R&D personnel will not acquire other irrelevant keys and prevent the keys from being distributed randomly.

Referring to Step S12, a corresponding key is pushed to the user terminal according to a received key acquisition request. The received key acquisition request is a key acquisition request sent by the user terminal based on the environment switching interface, and the key acquisition request corresponds to the target encrypted environment. After the user terminal confirms the encrypted environment, if the user has an action to open the file, the corresponding key is pushed to the user.

Before pushing the key, different user terminals can also be configured with corresponding permissions on respective encrypted environments. Specifically, the permission information on the user terminal is checked; in response to that the permission information conforms to the permission on the target encrypted environment, the key corresponding to the target encrypted environment is searched for, and the key is pushed to the user terminal; in response to that the permission information does not conform to the permission on the target encrypted environment, a key corresponding to the permission information is searched for, and the key is pushed to the user terminal. The above operation can ensure that if the user terminal does not have the permission to obtain the key, the key is not pushed to the user terminal, so as to avoid misoperation by the user. For example, if a R&D personnel mistakenly selects the financial environment, but in fact the computer does not have the permission to read financial documents, the financial key will not be pushed to the R&D personnel so as to further ensure that the key is not distributed randomly.

The above configuration method in Step S11 is to configure the encrypted environment within the permission scope for different user terminals; and the configuration method in Step S12 is to authenticate the user terminal before pushing the key, at least one of the above two methods can be implemented to ensure that the key is not distributed randomly.

Figure 3:
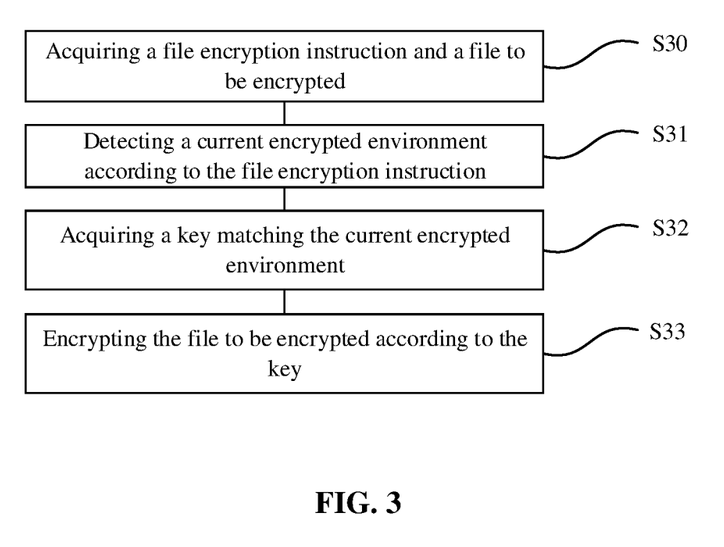
FIG. 3 illustrates a schematic diagram of the implementation steps of the method described in an embodiment of the disclosure.

An embodiment of the method for operating a file described in the disclosure is given below in combination with the accompanying drawings, and the operation of this embodiment is an encryption operation. FIG. 3 illustrates a schematic diagram of the implementation steps of the method described in the above embodiment, which includes: in Step S30, the file encryption instruction and the file to be encrypted are acquired; in Step S31, a current encrypted environment is detected according to the file encryption instruction; in Step S32, a key matching the current encrypted environment is acquired; and in Step S33, the file to be encrypted is encrypted according to the key.

The above method is a step to be implemented by the user terminal during the encryption operation. Specifically, referring to Step S30, the file encryption instruction and the file to be encrypted are acquired. The file to be encrypted may be any data file stored in a computer.

In Step S31, a current encrypted environment is detected according to the file encryption instruction. In one embodiment of the disclosure, the encrypted environments may include, for example, a plurality of encrypted environments such as an ordinary office environment, an R&D environment, a financial environment, and a procurement environment, and there may also be a hierarchical relationship between different environments. FIG. 2A illustrates a secret level configuration method for an encrypted environment in an embodiment of the disclosure. The secret level of an ordinary office environment is the lowest, and the R&D environment, financial environment, procurement environment, etc. have higher secret levels and are independent of each other.

In Step S32, a key matching the current encrypted environment is acquired. According to the above configuration method, each encrypted environment is configured with a corresponding key, including general office keys, R&D keys, financial keys, and procurement keys. Wherein the department that uses the general office key is all employees, and all employees can have this office key and use this key to encrypt all ordinary office files. The employees in the R&D and production department use the R&D key to encrypt R&D files, and the office key to encrypt ordinary office files. The files encrypted by the office key can be circulated in all departments (without decryption), and the files encrypted by the R&D key can only be circulated in the R&D and production departments, for the reason that only these departments have the key. The configuration of other departments is similar. The identifier may be, as shown in FIG. 2B, a lock icon is attached to the icon of the file to be operated to distinguish whether the file to be operated is an encrypted file by whether it has the lock icon, and the lock icon has different colors to distinguish between different encryption modes. The key used for encryption is one of the keys defined in this step. The type of the key uniquely corresponds to the encrypted environment.

In one embodiment, if the current encrypted environment is a first encrypted environment, the file encryption instruction specifies a second encryption mode corresponding to a second encrypted environment, and the method further includes: providing an environment switching interface for selection of an encrypted environment; and switching the current encrypted environment to the second encrypted environment when a trigger instruction to the environment switching interface is detected; where acquiring the key matching the current encrypted environment and operating the file to be operated according to the key includes: acquiring a second key matching the second encrypted environment, and encrypting the file to be encrypted according to the second key. The encrypted environment and the identifier are the encrypted environment and the identifier specified in the above Step S30. In one embodiment of the disclosure, as shown in FIG. 2C, buttons of different colors and/or texts are provided on the selection interface of the user terminal to distinguish different encrypted environments. The color of the button is the same as that of the lock icon to avoid misoperation. For example, as shown in FIG. 2C, buttons of different colors are set on the top of the computer screen, corresponding to four encrypted environments respectively. In other embodiments, it may also be a mobile phone screen or other terminal display apparatus used to read encrypted files; the buttons of different colors shown can also be replaced with buttons of different shapes, or replaced by a sliding switch or scroll wheel to switch between different encrypted environments.

In this step, before switching the current encrypted environment to the second encrypted environment, the encryption status of the file to be operated is detected; and when the file to be operated has been operated in a first encryption mode corresponding to the first encrypted environment, a first key matching the first encrypted environment is acquired, and the file to be operated is operated by the first key. For example, for files encrypted in the R&D environment, only the R&D key is used for operation, which prevents the key from being distributed randomly.

In this step, the encrypted environment within the permission scope can be configured for different user terminals. For example, for the computer of the R&D personnel, only two selection buttons of the ordinary office environment and the R&D environment are configured, and the selection buttons of other encrypted environments, such as the financial environment, are not configured, which can ensure that R&D personnel will not acquire other irrelevant keys, for example, the financial environment, and prevent the keys from being distributed randomly.

Referring to Step S32, according to the selected encrypted environment, a corresponding key is requested to open the encrypted file. After the encrypted environment is selected, when the file is opened, it requests the server to issue the corresponding key. Before pushing the key, authentication can also be initiated first, if the user terminal does not have the permission to obtain the key, it cannot request the key to avoid misoperation by the user. For example, if a R&D personnel mistakenly selects the financial environment, but in fact the computer does not have the permission to read financial documents, he cannot obtain the key so as to further ensure that the key is not distributed randomly.

The above configuration method in Step S31 is to configure the encrypted environment within the permission scope for different user terminals; and the configuration method in Step S32 is to authenticate the user terminal before pushing the key, at least one of the above two methods can be implemented to ensure that the key is not distributed randomly.

Figure 4:
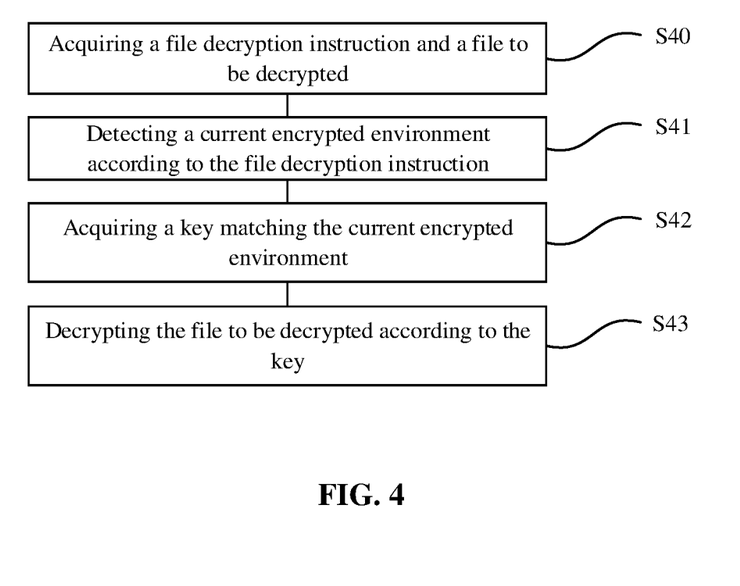
FIG. 4 illustrates a schematic diagram of the implementation steps of the method described in an embodiment of the disclosure.
Figure 5:
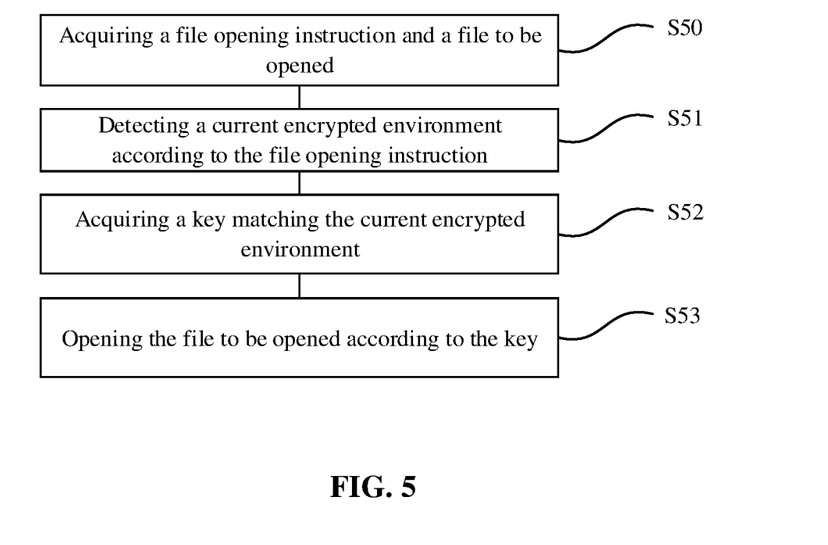
FIG. 5 illustrates a schematic diagram of the implementation steps of the method described in an embodiment of the disclosure.

An embodiment of the method for operating a file described in the disclosure is given below in combination with the accompanying drawings, and the operation of this embodiment is an decryption operation. FIG. 4 illustrates a schematic diagram of the implementation steps of the method described in the above embodiment, which includes: in Step S40, the file decryption instruction and the file to be decrypted are acquired; in Step S41, a current encrypted environment is detected according to the file decryption instruction; in Step S42, a key matching the current encrypted environment is acquired; and in Step S43, the file to be decrypted is decrypted according to the key.

The above method is a step to be implemented by the user terminal during the decryption operation. Specifically, referring to Step S40, the file decryption instruction and the file to be decryption are acquired. The file to be decryption may be any data file stored in a computer.

In Step S41, a current encrypted environment is detected according to the file decryption instruction. In one embodiment of the disclosure, the encrypted environments may include, for example, a plurality of encrypted environments such as an ordinary office environment, an R&D environment, a financial environment, and a procurement environment, and there may also be a hierarchical relationship between different environments. FIG. 2A illustrates a secret level configuration method for an encrypted environment in an embodiment of the disclosure. The secret level of an ordinary office environment is the lowest, and the R&D environment, financial environment, procurement environment, etc. have higher secret levels and are independent of each other.

In Step S42, a key matching the current encrypted environment is acquired. According to the above configuration method, each encrypted environment is configured with a corresponding key, including general office keys, R&D keys, financial keys, and procurement keys. Wherein the department that uses the general office key is all employees, and all employees can have this office key and use this key to encrypt all ordinary office files. The employees in the R&D and production department use the R&D key to decrypt R&D files, and the office key to decrypt ordinary office files. The files decrypted by the office key can be circulated in all departments, and the files decrypted by the R&D key can only be circulated in the R&D and production departments, for the reason that only these departments have the key. The configuration of other departments is similar. The identifier may be, as shown in FIG. 2B, a lock icon is attached to the icon of the file to be decrypted to distinguish whether the file to be operated is an decrypted file by whether it has the lock icon, and the lock icon has different colors to distinguish between different encryption modes. The key used for decryption is one of the keys defined in this step. The type of the key uniquely corresponds to the encrypted environment.

In one embodiment, if the current encrypted environment is a first encrypted environment, the file decryption instruction indicates a second encryption mode corresponding to a second encrypted environment, and the method further includes: providing an environment switching interface for selection of an encrypted environment; and switching the current encrypted environment to the second encrypted environment when a trigger instruction to the environment switching interface is detected; where acquiring the key matching the current encrypted environment and decrypting the file to be decrypted according to the key includes: acquiring a second key matching the second encrypted environment, and decrypting the file to be decrypted according to the second key. The encrypted environment and the identifier are the encrypted environment and the identifier specified in the above Step S40. In one embodiment of the disclosure, as shown in FIG. 2C, buttons of different colors and/or texts are provided on the selection interface of the user terminal to distinguish different encrypted environments. The color of the button is the same as that of the lock icon to avoid misoperation. For example, as shown in FIG. 2C, buttons of different colors are set on the top of the computer screen, corresponding to four encrypted environments respectively. In other embodiments, it may also be a mobile phone screen or other terminal display apparatus used to read encrypted files; the buttons of different colors shown can also be replaced with buttons of different shapes, or replaced by a sliding switch or scroll wheel to switch between different encrypted environments.

In this step, before switching the current encrypted environment to the second encrypted environment, the decryption status of the file to be operated is detected; and when the file to be operated has been operated in a first encryption mode corresponding to the first encrypted environment, a first key matching the first encrypted environment is acquired, and the file to be operated is operated by the first key. For example, for files decrypted in the R&D environment, only the R&D key is used for operation, which prevents the key from being distributed randomly.

In this step, the encrypted environment within the permission scope can be configured for different user terminals. For example, for the computer of the R&D personnel, only two selection buttons of the ordinary office environment and the R&D environment are configured, and the selection buttons of other encrypted environments, such as the financial environment, are not configured, which can ensure that R&D personnel will not acquire other irrelevant keys, for example, the financial environment, and prevent the keys from being distributed randomly.

Referring to Step S43, the file to be decrypted is decrypted according to the key. After the encrypted environment is selected, when the file is opened, it requests the server to issue the corresponding key. Before pushing the key, authentication can also be initiated first, if the user terminal does not have the permission to obtain the key, it cannot request the key to avoid misoperation by the user. For example, if a R&D personnel mistakenly selects the financial environment, but in fact the computer does not have the permission to read financial documents, he cannot obtain the key so as to further ensure that the key is not distributed randomly.

The above configuration method in Step S41 is to configure the encrypted environment within the permission scope for different user terminals; and the configuration method in Step S42 is to authenticate the user terminal before pushing the key, at least one of the above two methods can be implemented to ensure that the key is not distributed randomly.

An embodiment of the method for operating a file described in the disclosure is given below in combination with the accompanying drawings, and the operation of this embodiment is an opening operation. FIG. 4 illustrates a schematic diagram of the implementation steps of the method described in the above embodiment, which includes: in Step S50, the file opening instruction and the file to be opened are acquired; in Step S51, a current encrypted environment is detected according to the file opening instruction; in Step S52, a key matching the current encrypted environment is acquired; and in Step S53, the file to be opened is opened according to the key.

The above method is a step to be implemented by the user terminal during the decryption operation. Specifically, referring to Step S40, the file decryption instruction and the file to be decryption are acquired. The file to be decryption may be any data file stored in a computer.

In Step SM, a current encrypted environment is detected according to the file opening instruction. In one embodiment of the disclosure, the encrypted environments may include, for example, a plurality of encrypted environments such as an ordinary office environment, an R&D environment, a financial environment, and a procurement environment, and there may also be a hierarchical relationship between different environments. FIG. 2A illustrates a secret level configuration method for an encrypted environment in an embodiment of the disclosure. The secret level of an ordinary office environment is the lowest, and the R&D environment, financial environment, procurement environment, etc. have higher secret levels and are independent of each other.

In one embodiment, when the current encrypted environment is the second encrypted environment and an opened file encrypted by the first encryption mode corresponding to the first encrypted environment or an unencrypted opened file is detected, it is prompted to close the opened file.

In Step S52, a key matching the current encrypted environment is acquired. According to the above configuration method, each encrypted environment is configured with a corresponding key, including general office keys, R&D keys, financial keys, and procurement keys. Wherein the department that uses the general office key is all employees, and all employees can have this office key and use this key to open all ordinary office files. The employees in the R&D and production department use the R&D key to open R&D files, and the office key to open ordinary office files. The files open by the office key can be circulated in all departments, and the files opened by the R&D key can only be circulated in the R&D and production departments, for the reason that only these departments have the key. The configuration of other departments is similar. The identifier may be, as shown in FIG. 2B, a lock icon is attached to the icon of the file to be opened to distinguish whether the file to be operated is an encrypted file by whether it has the lock icon, and the lock icon has different colors to distinguish between different encryption modes. The key used for opening is one of the keys defined in this step. The type of the key uniquely corresponds to the encrypted environment.

In one embodiment, if the current encrypted environment is a first encrypted environment, the file opening instruction indicates a second encryption mode corresponding to a second encrypted environment, and the method further includes: providing an environment switching interface for selection of an encrypted environment; and switching the current encrypted environment to the second encrypted environment when a trigger instruction to the environment switching interface is detected; where acquiring the key matching the current encrypted environment and opening the file to be opened according to the key includes: acquiring a second key matching the second encrypted environment, and opening the file to be opened according to the second key. The encrypted environment and the identifier are the encrypted environment and the identifier specified in the above Step S50. In one embodiment of the disclosure, as shown in FIG. 2C, buttons of different colors and/or texts are provided on the selection interface of the user terminal to distinguish different encrypted environments. The color of the button is the same as that of the lock icon to avoid misoperation. For example, as shown in FIG. 2C, buttons of different colors are set on the top of the computer screen, corresponding to four encrypted environments respectively. In other embodiments, it may also be a mobile phone screen or other terminal display apparatus used to read encrypted files; the buttons of different colors shown can also be replaced with buttons of different shapes, or replaced by a sliding switch or scroll wheel to switch between different encrypted environments.

In this step, before switching the current encrypted environment to the second encrypted environment, the opening status of the file to be operated is detected; and when the file to be operated has been operated in a first encryption mode corresponding to the first encrypted environment, a first key matching the first encrypted environment is acquired, and the file to be operated is operated by the first key. For example, for files opened in the R&D environment, only the R&D key is used for operation, which prevents the key from being distributed randomly.

In this step, the encrypted environment within the permission scope can be configured for different user terminals. For example, for the computer of the R&D personnel, only two selection buttons of the ordinary office environment and the R&D environment are configured, and the selection buttons of other encrypted environments, such as the financial environment, are not configured, which can ensure that R&D personnel will not acquire other irrelevant keys, for example, the financial environment, and prevent the keys from being distributed randomly.

Referring to Step S53, the file to be opened is opened according to the key. After the encrypted environment is selected, when the file is opened, it requests the server to issue the corresponding key. Before pushing the key, authentication can also be initiated first, if the user terminal does not have the permission to obtain the key, it cannot request the key to avoid misoperation by the user. For example, if an R&D personnel mistakenly selects the financial environment, but in fact the computer does not have the permission to read financial documents, he cannot obtain the key so as to further ensure that the key is not distributed randomly.

The above configuration method in Step S51 is to configure the encrypted environment within the permission scope for different user terminals; and the configuration method in Step S52 is to authenticate the user terminal before pushing the key, at least one of the above two methods can be implemented to ensure that the key is not distributed randomly.

The above is explained with three specific operation scenarios of encryption, decryption, and opening. It should be pointed out that in other embodiments, any other file operations, such as copying, deleting, and modifying file names, can be restricted to ensure that they can only be performed in the specified encrypted environment to ensure that the confidentiality environment is safe and reliable.

The encrypted files used in the above embodiments are represented by an encrypted file icon and an identifier. The identifier is used to indicate the encryption mode of the encrypted file. The encrypted file is encrypted under the encrypted environment corresponding to the encryption mode by the key corresponding to the encryption mode. As an embodiment, the identifier is a lock icon attached to the icon of the encrypted file to distinguish whether the file to be operated is an encrypted file by whether it has the lock icon or not, and different encryption modes are distinguished by different colors of the lock icon.

The methods described in the above multiple embodiments may be configured in a computer-readable storage medium on which a computer program is stored, and when the program is executed by a processor, the steps of the method described in any of the above multiple embodiments are implemented.

The methods described in the above multiple embodiments may be configured in a computer device, including a memory, a processor, and a computer program stored in the memory and running on the processor, and when the processor executes the program, the processor implements the steps of the method described in any one of the above multiple embodiments.

The above technical solution prevents the key from being randomly distributed through the configuration and differentiated distribution of the encrypted environment, and can prevent the generation of low-secret level encrypted files from being erroneously encrypted to high-secret level due to the operation of the high-secret level files.

The above are only part of the implementation of the disclosure. It should be pointed out that for those of ordinary skill in the art, without departing from the principles of the disclosure, several improvements and modifications can be made, which should also be considered as the protection scope of the disclosure.

What is claimed is:
1. A method for pushing a key, comprising:
setting a plurality of keys, each of which corresponds to a different encrypted environment;
configuring a user terminal with an environment switching interface for selection of an encrypted environment, configuring different user terminals with corresponding permissions on respective encrypted environments; and
pushing a corresponding key to the user terminal according to a received key acquisition request, which comprises:
determining a target encrypted environment according to the received key acquisition request;
checking permission information for the user terminal:
in response to that the permission information conforms to the permission on the target encrypted environment, searching for a key corresponding to the target encrypted environment, and pushing the key to the user terminal; and
in response to that the permission information does not conform to the permission on the target encrypted environment, searching for a key corresponding to the permission information, and pushing the key to the user terminal.

2. The method of claim 1, wherein in the environment switching interface, different encrypted environments are distinguished by buttons of different colors.

3. A method for operating a file, comprising:
acquiring a file operation instruction and a file to be operated;
detecting a current encrypted environment according to the file operation instruction;
acquiring a key matching the current encrypted environment; and
operating the file to be operated by using the key;
wherein the current encrypted environment is a first encrypted environment, the file operation instruction specifies a second encryption mode corresponding to a second encrypted environment, and the method further comprise:
providing an environment switching interface for selection of an encrypted environment; and
switching the current encrypted environment to the second encrypted environment when a trigger instruction to the environment switching interface is detected;
wherein acquiring the key matching the current encrypted environment and operating the file to be operated according to the key comprises:
acquiring a second key matching the second encrypted environment, and operating the file to be operated according to the second key.

4. The method of claim 3, wherein the operating is selected from any one of encryption, decryption, or opening.

5. The method of claim 3, further comprising: before switching the current encrypted environment to the second encrypted environment,
detecting an encryption status of the file to be operated; and
when the file to be operated has been operated in a first encryption mode corresponding to the first encrypted environment, acquiring a first key matching the first encrypted environment, and operating the file to be operated by the first key.

6. The method of claim 3, further comprising:
representing an encryption status of the file to be operated by an encrypted file icon and an identifier.

7. The method of claim 6, wherein the identifier is a lock icon attached to an icon of the file to be operated to distinguish whether the file to be operated is an encrypted file by whether it has the lock icon, and the lock icon has different colors to distinguish between different encryption modes.

8. The method of claim 7, wherein on an interface for operating the file, different encrypted environments are distinguished by buttons of different colors, and the colors of the buttons match the colors of the lock icon.

9. A computer device, comprising:
a memory storing processor-executable instructions; and
a processor configured to execute the stored processor-executable instructions to perform operations of:
setting a plurality of keys, each of which corresponds to a different encrypted environment;
configuring a user terminal with an environment switching interface for selection of an encrypted environment, configuring different user terminals with corresponding permissions on respective encrypted environments; and
pushing a corresponding key to the user terminal according to a received key acquisition request, which comprises:
determining a target encrypted environment according to the received key acquisition request;
checking permission information for the user terminal;
in response to that the permission information conforms to the permission on the target encrypted environment, searching for a key corresponding to the target encrypted environment, and pushing the key to the user terminal; and
in response to that the permission information does not conform to the permission on the target encrypted environment, searching for a key corresponding to the permission information, and pushing the key to the user terminal.

10. The computer device of claim 9, wherein in the environment switching interface, different encrypted environments are distinguished by buttons of different colors.

* * * * *